(12) United States Patent
Wenderoth et al.

(10) Patent No.: US 8,333,904 B2
(45) Date of Patent: *Dec. 18, 2012

(54) ANTIFREEZE CONCENTRATES BASED ON AMIDES, AND COOLANT COMPOSITIONS COMPRISING THEM AND INTENDED FOR PROTECTING MAGNESIUM AND MAGNESIUM ALLOYS

(75) Inventors: Bernd Wenderoth, Birkenau (DE); Karlheinz Schäker, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1161 days.

This patent is subject to a terminal disclaimer.

(21) Appl. No.: 10/333,611

(22) PCT Filed: Jul. 13, 2001

(86) PCT No.: PCT/EP01/08108
§ 371 (c)(1),
(2), (4) Date: Jan. 22, 2003

(87) PCT Pub. No.: WO02/08354
PCT Pub. Date: Jan. 31, 2002

(65) Prior Publication Data
US 2003/0164470 A1 Sep. 4, 2003

(30) Foreign Application Priority Data
Jul. 24, 2000 (DE) .................................. 100 36 031

(51) Int. Cl.
*C09K 5/00* (2006.01)
(52) U.S. Cl. ................. 252/73; 252/74; 252/75; 252/76; 252/77
(58) Field of Classification Search .................... 252/73, 252/77, 78.1
See application file for complete search history.

(56) References Cited

U.S. PATENT DOCUMENTS

| 3,362,910 | A | | 1/1968 | Ordelt et al. | |
|---|---|---|---|---|---|
| 4,404,113 | A | | 9/1983 | Peters et al. | |
| RE33,124 | E | * | 12/1989 | Singer | 252/18 |
| 5,366,651 | A | * | 11/1994 | Maes et al. | 252/76 |
| 5,723,061 | A | * | 3/1998 | Ciardi et al. | 252/79 |
| 5,725,794 | A | * | 3/1998 | Bruhnke et al. | 252/73 |

FOREIGN PATENT DOCUMENTS

| CA | 2307621 | 4/1999 |
|---|---|---|
| EP | 229 440 | 7/1987 |
| EP | 251 480 | 1/1988 |
| WO | 86/00917 | 2/1986 |
| WO | 95/07323 | 3/1995 |
| WO | 00/22189 | 4/2000 |

* cited by examiner

*Primary Examiner* — Necholus Ogden, Jr.
(74) *Attorney, Agent, or Firm* — Novak Druce + Quigg LLP

(57) ABSTRACT

The invention relates to antifreeze concentrates which are based on alkylene glycols or derivatives thereof or on glycerin, containing 0.05 to 10 wt. % of one or more cathoxylic acid amides and/or sulfonic acid amides in relation to the total quantity of concentrate.

15 Claims, No Drawings

ANTIFREEZE CONCENTRATES BASED ON AMIDES, AND COOLANT COMPOSITIONS COMPRISING THEM AND INTENDED FOR PROTECTING MAGNESIUM AND MAGNESIUM ALLOYS

The present invention relates to novel antifreeze concentrates based on carboxamides or sulfonamides. The present invention furthermore relates to ready-to-use aqueous coolant compositions which comprise said antifreeze concentrates. The present invention also relates to the use of these antifreeze concentrates for the preparation of aqueous coolant compositions for magnesium-containing and/or aluminum-containing internal combustion engines.

Antifreeze concentrates for the cooling circulations of internal combustion engines, for example in automobiles, generally contain alkylene glycols, especially ethylene glycol or propylene glycol, as the main component. For use in the cooling system, they are diluted with water and, in addition to protection from freezing, are also supposed to ensure good heat removal. Alkylene glycol water mixtures are however very corrosive at the operating temperatures of internal combustion engines. The various metals and their alloys which occur in the cooling system therefore have to be adequately protected from various types of corrosion, for example pitting, crevice corrosion, erosion or cavitation.

The prior art discloses a large number of individual chemical substances for use as corrosion inhibitors in such cooling systems with a wide range of different metals, such as steel, cast iron, copper, brass, aluminum and their alloys and solder metals, for example tin solder. When they are used for cooling the engines now predominantly used by the automotive industry and comprising gray cast iron or cast aluminum alloys, the resulting radiator antifreezes fulfill the expectations of them with regard to corrosion prevention.

In automotive construction, attempts are currently being made to reduce the fuel consumption by reducing the weight of motor vehicles. Thus, attempts have been made, for example, to reduce the weight of engines by constructing them partly or wholly of magnesium or magnesium alloys.

However, tests have shown that, owing to the higher chemical reactivity of magnesium, the radiator antifreezes on the market today provide virtually no corrosion prevention for this metal and its alloys.

Nevertheless, there have been to date only a few patent publications which offer solutions to these problems.

As long ago as 1931, DRP 569 771 (1) described a cooling liquid for internal combustion engine parts consisting of magnesium alloys, which liquid comprised a polyhydric alcohol containing small amounts of an alkali metal fluoride, in the presence or absence of water.

In the same year, DRP 579 185 (2) described the use of alkali metal sulfides for the same purpose.

However, the use of fluorides or sulfides is no longer desirable today owing to the toxicological hazards of these classes of substances.

WO 95/07323 (3) describes anhydrous radiator antifreezes based on monopropylene glycol, containing molybdate, nitrate and an azole derivative, such as tolutriazole, preventing corrosion of various metals, including magnesium and magnesium alloys. However, anhydrous radiator antifreezes are not relevant in practice owing to their poor thermal conductivity.

EP 229 440 B1 (4) describes cooling concentrates which are also said to have corrosion prevention properties for magnesium, containing aliphatic monocarboxylic acid salts, aliphatic dicarboxylic acid salts and a hydrocarbon-triazole and, if required, additionally an alkali metal borate, silicate, benzoate, nitrate, nitrite or molybdate and/or a hydrocarbon-carbazole. However, specific corrosion test results are not described for magnesium.

EP 251 480 B1 (5) describes coolant concentrates containing alkylbenzoic acid salts, aliphatic monocarboxylic acid salts and a triazole and, if required, further components, which are said to lead to improved corrosion prevention not only in the case of the metals conventionally used to date in engine construction but also in the case of magnesium. Here too, however, specific corrosion test results are not described for magnesium. As an improvement compared with (5) WO 00/22189 (6) describes cooling liquids which contain a combination of carboxylic acid salts with fluoride and/or fluorocarboxylic acid salts. However, a disadvantage here is in particular the use of the toxicologically unsafe hydrochloric acid for the preparation of these compositions.

WO 99/19418 (7) describes a cooling liquid based on polyhydric alcohols for magnesium components, consisting of a combination of branched aliphatic carboxylic acid salts and alkanolamine phosphates and tolutriazole/benzotriazole, to which, if required, further additives, such as aliphatic or aromatic mono- and/or dicarboxylic acid salts, mercaptobenzothiazole or carboxymethylcellulose, may be added. However, the corrosion test results are inadequate, in particular in the presence of relatively large amounts of water.

It is an object of the present invention to provide corresponding antifreeze concentrates which no longer have the disadvantages of the prior art.

Little is known to date about the use of carboxamides or sulfonamides as corrosion inhibitors. Thus, EP 320 281 A1 (8) describes the use of anthranilamide in synthetic ester-based lubricating oils as a corrosion inhibitor for turbo engines.

EP 341 536 B1 (9) discloses the use of specific aromatic sulfonamidocarboxylic acids as water-soluble corrosion inhibitors for cleaning processes, cooling water, cooling lubricants, hydraulic fluids and other functional solutions and emulsions. Corrosion of iron, aluminum, zinc, copper and their alloys is thereby suppressed.

The use of the amides as corrosion inhibitors in antifreeze concentrates based on alkylene glycols, glycerol or their derivatives is unknown to date.

Surprisingly, it has now been found that carboxamides and sulfonamides are effective corrosion inhibitors for magnesium and magnesium alloys in radiator antifreezes based on such antifreeze concentrates.

We have found that this object is achieved by antifreeze concentrates based on alkylene glycols, glycerol or their derivatives, which contain a) from 0.05 to 10% by weight, based on the total amount of the concentrate, of one or more carboxamides and/or sulfonamides.

In a preferred embodiment, the component a) is formed from one or more aliphatic, cycloaliphatic, aromatic or heteroaromatic carboxamides and/or sulfonamides, each of 2 to 16, preferably each of 3 to 12, carbon atoms.

The amides may be unsubstituted or alkyl-substituted on the nitrogen atom of the amido group, for example by $C_1$-$C_4$-alkyl. Aromatic or heteroaromatic skeletons of the molecule can of course also be alkyl groups. One or more, preferably one or two, amido groups may be present in the molecule. The amides may additionally carry functional groups, preferably $C_1$-$C_4$-alkoxy, amino, chlorine, fluorine, hydroxyl and/or acetyl; in particular, such functional groups are present as substituents on aromatic or heteroaromatic rings present.

Typical examples of such carboxamides and sulfonamides are stated below.

aromatic carboxamides:
  benzamide
  2-methylbenzamide
  3-methylbenzamide
  4-methylbenzamide
  2,4-dimethylbenzamide
  4-tert-butylbenzamide
  3-methoxybenzamide
  4-methoxybenzamide
  2-aminobenzamide (anthranilamide)
  3-aminobenzamide
  4-aminobenzamide
  3-amino-4-methylbenzamide
  2-chlorobenzamide
  3-chlorobenzamide
  4-chlorobenzamide
  2-fluorobenzamide
  3-fluorobenzamide
  4-fluorobenzamide
  2,6-difluorobenzamide
  4-hydroxybenzamide
  2-hydroxybenzamide (salicylamide)
  phthalamide
  terephthalamide
heteroaromatic carboxamides:
  nicotinamide (pyridine-3-carboxamide)
  picolinamide (pyridine-2-carboxamide)
aliphatic carboxamides:
  succinamide
  adipamide
  propionamide
  hexanamide
cycloaliphatic carboxamides having the amido group as part of the ring:
  2-pyrrolidone
  N-methyl-2-pyrrolidone
  2-piperidone
  ε-caprolactam
aromatic sulfonamides:
  benzenesulfonamide
  o-toluenesulfonamide
  m-toluenesulfonamide
  p-toluenesulfonamide
  4-tert-butylbenzenesulfonamide
  4-fluorobenzenesulfonamide
  4-hydroxybenzenesulfonamide
  2-aminobenzenesulfonamide
  3-aminobenzenesulfonamide
  4-aminobenzenesulfonamide
  4-acetylbenzenesulfonamide In a further preferred embodiment, the novel antifreeze concentrates additionally contain nonionic compounds mentioned below b) from 0.05 to 5% by weight, based on the total amount of the concentrate, of one or more aliphatic, cycloaliphatic or aromatic amines of 2 to 15 carbon atoms which may additionally contain ether oxygen atoms or hydroxyl groups, and/or c) from 0.05 to 5% by weight, based on the total amount of the concentrate, of one or more mononuclear or dinuclear unsaturated or partly unsaturated heterocycles of 4 to 10 carbon atoms which may be benzofused and may carry additional functional groups, and/or d) from 0.05 to 5% by weight of one or more tetra-($C_1$-$C_8$-alkoxy)silanes (tetra-$C_1$-$C_8$-alkyl esters of orthosilicic acid), based on the total amount of concentrate.

Examples of suitable aliphatic, cycloaliphatic or aromatic amines b) of 2 to 15, preferably 4 to 8, carbon atoms, which may additionally contain ether oxygen atoms or hydroxyl groups, are ethylamine, propylamine, isopropylamine, n-butylamine, isobutylamine, sec-butylamine, tert-butylamine, n-pentylamine, n-hexylamine, n-heptylamine, n-octylamine, isononylamine, di-n-propylamine, diisopropylamine, di-n-butylamine, mono-, di- and triethanolamine, piperidine, morpholine, aniline and benzylamine. Aliphatic and cycloaliphatic amines b) are as a rule saturated.

The heterocycles c) are, for example, mononuclear five- or six-membered systems which have 1, 2 or 3 nitrogen atoms or have one nitrogen atom and one sulfur atom which may be benzofused. Dinuclear systems comprising five- and/or six-membered ring moieties having typically 2, 3, or 4 nitrogen atoms may also be used. The heterocycles c) may additionally carry functional groups, preferably $C_1$-$C_4$-alkoxy, amino and/or mercapto. The heterocyclic skeleton can of course also carry alkyl groups.

Typical examples of heterocycles c) are benzotriazole, tolutriazole, hydrogenated tolutriazole, 1H-1,2,4-triazole, benzimidazole, benzothiazole, adenine, purine, 6-methoxypurine, indole, isoindole, isoindoline, pyridine, pyrimidine, 3,4-diaminopyridine, 2-aminopyrimidine and 2-mercaptopyrimidine.

For example, tetramethoxysilane, tetraethoxysilane, tetra-n-propoxysilane or tetra-n-butoxysilane is suitable for the tetra-($C_1$-$C_8$-alkoxy) silanes d).

Furthermore, the novel antifreeze concentrates may additionally contain one or more of the compounds stated below e) from 0.05 to 5% by weight, based on the total amount of the concentrate, of one or more aliphatic or aromatic monocarboxylic acids, each of 3 to 16 carbon atoms, in the form of their alkali metal, ammonium or substituted ammonium salts and/or f) from 0.05 to 5% by weight, based on the total amount of concentrate, of one or more aliphatic or aromatic dicarboxylic acids, each of 4 to 20 carbon atoms, in the form of their alkali metal, ammonium or substituted ammonium salts and/or g) one or more alkali metal borates, alkali metal phosphates, alkali metal silicates, alkali metal nitrites, alkali metal or alkaline earth metal nitrates, molybdates or alkali metal or alkaline earth metal fluorides in amounts of, in each case, up to 1% by weight, based on the total amount of the concentrate, and/or h) up to 1% by weight, based on the total amount of the concentrate, of one or more hard water stabilizers based on polyacrylic acid, polymaleic acid, acrylic acid/maleic acid copolymers, polyvinylpyrrolidone, polyvinylimidazole, vinylpyrrolidone/vinylimidazole copolymers and/or copolymers of unsaturated carboxylic acids and olefins.

Compounds of groups e), f) and g) are additional corrosion inhibitors.

Examples of linear, branched or cyclic aliphatic monocarboxylic acids e) of these types are propionic acid, pentanoic acid, hexanoic acid, cyclohexylacetic acid, octanoic acid, 2-ethylhexanoic acid, nonanoic acid, isononanoic acid, decanoic acid, undecanoic acid and dodecanoic acid.

Particularly suitable aromatic monocarboxylic acid e) of this type is benzoic acid, and, for example, $C_1$-to $C_8$-alkyl-benzoic acids, such as o-, m-, p-methylbenzoic acid or p-tert-butylbenzoic acid, and hydroxyl-containing aromatic monocarboxylic acids, such as o-, m- or p-hydroxybenzoic acid or o-, m- or p-(hydroxymethyl)benzoic acid, or halobenzoic acids, such as o-, m- or p-fluorobenzoic acid, are also suitable.

Typical examples of such dicarboxylic acids f) are malonic acid, succinic acid, glutaric acid, adipic acid, pimelic acid, suberic acid, azeleic acid, sebacic acid, undecanedioic acid, dodecanedioic acid, dicyclopentadienedicarboxylic acid, phthalic acid and terephthalic acid.

All stated carboxylic acids are present as alkali metal salts, especially as sodium or potassium salts, or as ammonium salts substituted ammonium salts (amine salts), for example with trialkylamines or trialkanolamines.

Typical examples of additional corrosion inhibitors stated under g), are sodium tetrahydroborate (borax), disodium hydrogen phosphate, trisodium phosphate, sodium metasilicate, sodium nitrite, sodium nitrate, magnesium nitrate, sodium fluoride, potassium fluoride, magnesium fluoride and sodium molybdate.

When alkali metal silicates are present, they are expediently stabilized by conventional organosilicophosphonates or organosilicosulfonates in conventional amounts.

In addition to said inhibitor components, for example, soluble magnesium salts of organic acids, e.g. magnesium benzenesulfonate, magnesium methanesulfonate, magnesium acetate or magnesium propionate, hydrocarbazoles or quaternized imidazoles, as described in DE-A 196 05 509, may also be used, in conventional amounts, as further inhibitors.

The pH of the novel antifreeze concentrates is usually from 4 to 11, preferably from 4 to 10, in particular from 4.5 to 8.5. The desired pH can, if required, also be established by adding alkali metal hydroxide, ammonia or amines to the formulation, solid sodium hydroxide or potassium hydroxide and aqueous sodium hydroxide or potassium hydroxide solution being particularly suitable for this purpose. Carboxylic acids to be concomitantly used are expediently added directly as corresponding alkali metal salts, in order to be automatically in the desired pH range; however, the carboxylic acid may also be added as free acids and then neutralized with alkali metal hydroxide, ammonia or amines and the desired pH established.

Suitable liquid alcoholic freezing point depressants, which usually account of the main component (as a rule at least 75, in particular at least 85, % by weight) of the novel antifreeze concentrates, are alkylene glycols and their derivatives and glycerol, in particular propylene glycol and especially ethylene glycol. However, higher glycols and glycol ethers are also suitable, for example diethylene glycol, dipropylene glycol and monoethers of glycols, such as the methyl, ethyl, propyl and butyl ethers of ethylene glycol, propylene glycol, diethylene glycol and dipropylene glycol. Mixtures of such glycols and glycol ethers and mixtures of these glycols with glycerol and, if required, with these glycol ethers may also be used.

In a preferred embodiment, the novel antifreeze concentrates are based on ethylene glycol or propylene glycol or mixtures of alkylene glycols or of glycerol with ethylene glycol or propylene glycol, which contain in each case at least 95% by weight of ethylene glycol and/or propylene glycol and/or glycerol.

The novel antifreeze concentrates may also contain conventional small amounts of antifoam (as a rule amounts of from 0.003 to 0.008% by weight), dyes and bitter substances for reasons relating to hygiene and safety in the case of swallowing (for example of the denatonium benzoate type) as further conventional assistants.

The present invention also relates to ready-to-use aqueous coolant compositions having a low freezing point, and in particular for radiator protection in the automotive sector, which comprise water and from 10 to 90, in particular from 20 to 60, % by weight of the novel antifreeze concentrates.

The novel antifreeze concentrates provide in particular more effective corrosion inhibition in the case of magnesium and magnesium alloys than the compositions of the prior art.

The examples which follow illustrate the invention without restricting it.

EXAMPLES

The aqueous coolant compositions shown in Table 1 were prepared from novel antifreeze concentrates, it being possible to obtain the antifreeze concentrates, for example, simply be dissolving the components in monoethylene glycol. The aqueous coolant compositions can be prepared therefrom by simple dilution with water.

The testing of these aqueous coolant compositions is carried out directly without further dilution in the static hot surface test (ASTM D 4340) using a magnesium test specimen of the alloy AZ91 HP or on a cast aluminum test specimen of the alloy GAlSi6Cu4. Instead of concentrated nitric acid, chromic acid, which is more suitable for this metal, was used for cleaning the magnesium test specimen after the test.

The results are shown in Table 2. They show that, in the case of magnesium, substantially better corrosion prevention is achieved with the novel coolant compositions than with compositions known from the prior art [potassium fluoride-containing formulation (Example 14); Glysantin® G 30 (commercial product from BASF Aktiengesellschaft, based on conventional Organic Acid Technology)] and at the same time good corrosion prevention is present in the case of aluminum. Here, the increase in weight in the case of aluminum in novel Example 11 indicates the formation of a stable protective layer.

TABLE 1

| | Novel aqueous coolant compositions | | | | | | | | |
|---|---|---|---|---|---|---|---|---|---|
| Components [% by weight] | Example 1 | Example 2 | Example 3 | Example 4 | Example 5 | Example 6 | Example 7 | Example 8 | Example 9 |
| Monoethylene glycol | 69 | 69 | 69 | 69 | 69 | 69 | 69 | 69 | 69 |
| Adipamide | 1 | | | | | | | | |
| Benzamide | | 1 | | | | | | | |
| Anthranilamide | | | 1 | | | | | | |
| 3-Aminobenzamide | | | | 1 | | | | | |
| 4-Aminobenzamide | | | | | 1 | | | | |
| N-Methyl-2-pyrrolidone | | | | | | 1 | | | |
| Picolinamide | | | | | | | 1 | | |
| Nicotinamide | | | | | | | | | 1 |

TABLE 1-continued

Novel aqueous coolant compositions

| | | | | | | | | | |
|---|---|---|---|---|---|---|---|---|---|
| Benzenesulfonamide | | | | | | | | | 1 |
| o-Toluenesulfonamide | | | | | | | | | |
| p-Toluenesulfonamide | | | | | | | | | |
| 2-Aminobenzenesulfonamide | | | | | | | | | |
| Potassium fluoride | | | | | | | | | |
| Triethanolamine | | | | | | | | | |
| Tolutriazole | | | | | | | | | |
| 1H-1,2,4-Triazole | | | | | | | | | |
| Salicylamide | | | | | | | | | |
| Distilled water | 30 | 30 | 30 | 30 | 30 | 30 | 30 | 30 | 30 |

| Components [% by weight] | Example 10 | Example 11 | Example 12 | Example 13 (Comparison) | Example 14 | Example 15 | Example 16 | Example 17 |
|---|---|---|---|---|---|---|---|---|
| Monoethylene glycol | 69 | 69 | 69 | 69 | 69 | 69 | 69 | 69 |
| Adipamide | | | | | | | | |
| Benzamide | | | | | | | | |
| Anthranilamide | | | | | | | | |
| 3-Aminobenzamide | | | | | | | | |
| 4-Aminobenzamide | | | | | | | | |
| N-Methyl-2-pyrrolidone | | | | | | | | |
| Picolinamide | | | | | | | | |
| Nicotinamide | | | | | | | | |
| Benzenesulfonamide | | | | | | | | |
| o-Toluenesulfonamide | 1 | | | | | | | |
| p-Toluenesulfonamide | | 1 | | | 0.5 | 1 | 1 | |
| 2-Aminobenzenesulfonamide | | | 1 | | | | | |
| Potassium fluoride | | | | 1 | | | | |
| Triethanolamine | | | | | 0.5 | 0.5 | 0.5 | |
| Tolutriazole | | | | | | 0.5 | | |
| 1H-1,2,4-Triazole | | | | | | | 0.5 | |
| Salicylamide | | | | | | | | 1 |
| Distilled water | 30 | 30 | 30 | 30 | 30 | 30 | 30 | 30 |

TABLE 2

Results in the static hot surface test according to ASTM D 4340

| Corrosion rate [mg/cm²/week] | Example 1 | Example 2 | Example 3 | Example 4 | Example 5 | Example 6 | Example 7 | Example 8 | Example 9 | Example 10 |
|---|---|---|---|---|---|---|---|---|---|---|
| Mg AZ91 HP | −2.61 | −4.52 | −5.43 | −2.14 | −2.27 | −3.87 | −4.31 | −3.02 | −0.77 | −2.37 |
| GAlSi6Cu4 | — | −1.09 | — | — | — | — | — | — | — | — |

| Corrosion rate [mg/cm²/week] | Example 11 | Example 12 | Example 13 (Comparison) | Example 14 | Example 15 | Example 16 | Example 17 | Glysantin ® G 30 (70% strength in H₂O) (Comparison) |
|---|---|---|---|---|---|---|---|---|
| Mg AZ91 HP | −1.97 | −2.77 | −12.42 | −3.84 | −0.66 | −2.12 | −3.00 | −21.98 |
| GAlSi6Cu4 | +0.33 | — | — | — | +0.34 | +0.29 | — | — |

The invention claimed is:

1. A process for protecting internal combustion engines comprising magnesium or magnesium alloys against corrosion, said process comprising adding coolant compositions to cooling systems of the internal combustion engines which comprise magnesium or magnesium alloys, which coolant compositions are based on an antifreeze concentrate which has a pH of from 4 to 11, and is based on alkylene glycols or their derivatives or on glycerol, containing a) from 0.05 to 10% by weight, based on the total amount of the concentrate, of one or more carboxamides and/or sulfonamides and wherein when compound a) is aliphatic, amides of said compound a) are unsubstituted or alkyl-substituted on the nitrogen atom of the amido group.

2. A process as claimed in claim 1, in which the component a) is formed from one or more aliphatic, cycloaliphatic, aromatic, or heteroaromatic carboxamides and/or sulfonamides, each of 2 to 16 carbon atoms.

3. A process as claimed in claim 1, in which the antifreeze concentrate additionally contains nonionic compounds stated below, b) from 0.05 to 5% by weight, based on the total amount of the concentrate, of one or more aliphatic, cycloaliphatic or aromatic amines of 2 to 15 carbon atoms which may additionally contain either oxygen atoms or hydroxyl groups, and/or c) from 0.05 to 5% by weight, based on the total amount of the concentrate, of one or more mononuclear or dinuclear unsaturated or partly unsaturated heterocycles of 4 to 10 carbon atoms which may be benzofused and may carry additional functional groups, and/or d) from 0.05 to 5% by weight of one or more tetra-($C_1$-$C_8$-alkoxy)silanes (tetra-$C_1$-$C_8$-alkyl esters of orthosilicic acid), based on the total amount of concentrate.

4. A process as claimed in claim 1, in which the antifreeze concentrate additionally contains compounds stated below:
   e) from 0.05 to 5% by weight, based on the total amount of the concentrate, of one or more aliphatic, cycloaliphatic or aromatic monocarboxylic acids, each of 3 to 16 carbon atoms, in the form of their alkali metal, ammonium or substituted ammonium salts and/or
   f) from 0.05 to 5% by weight, based on the total amount of concentrate, of one or more aliphatic or aromatic dicarboxylic acids, each of 3 to 20 carbon atoms, in the form of their alkali metal, ammonium or substituted ammonium salts and/or
   g) one or more alkali metal borates, alkali metal phosphates, alkali metal silicates, alkali metal nitrites, alkali metal or alkaline earth metal nitrates, molybdates or alkali metal or alkaline earth metal fluorides in amounts of, in each case, up to 1% by weight, based on the total amount of the concentrate, and/or
   h) up to 1% by weight, based on the total amount of the concentrate, of one or more hard water stabilizers based on polyacrylic acid, polymaleic acid, acrylic acid/maleic acid copolymers, polyvinylpyrrolidone, polyvinylimidazole, vinylpyrrolidone/vinylimidazole copolymers and/or copolymers of unsaturated carboxylic acids and olefins.

5. A process as claimed in claim 1, in which the antifreeze concentrate is based on ethylene glycol or propylene glycol or a mixture of alkylene glycols or of glycerol with ethylene glycol and propylene glycol, which contains in each case at least 95% by weight of ethylene glycol and/or propylene glycol and/or glycerol.

6. A process as claimed in claim 1, in which the coolant composition is a ready-to-use aqueous coolant composition having a depressed freezing point, which comprises water and from 10 to 90% by weight of an antifreeze concentrate as claimed in claim 1.

7. A process as claimed in claim 1, in which the component a) is formed from one or more aliphatic, cycloaliphatic, aromatic, or heteroaromatic carboxamides and/or sulfonamides, each of 3 to 12 carbon atoms.

8. In a process of protecting internal combustion engines containing magnesium or magnesium alloys from corrosion and containing a coolant system, the improvement comprising adding to the coolant system of said engine an antifreeze concentrate, based on alkylene glycols or their derivates or on glycerol, containing
   a) from 0.05 to 10% by weight, based on the total amount of the concentrate, of one or more carboxamides and/or sulfonamides.

9. A process as claimed in claim 1, wherein when compound a) is aromatic or heteroaromatic, amides and/or rings of said compound a) are unsubstituted or substituted with one or more functional groups chosen from a group consisting of $C_1$-$C_4$-alkoxy, amino, chlorine, fluorine, hydroxyl, and acetyl.

10. A process as claimed in claim 1, wherein the coolant composition comprises from 1 to 10% by weight of component a).

11. A process as claimed in claim 1, wherein the component a) is formed from one or more aliphatic carboxamides and/or one or more aliphatic sulfonamides.

12. A process as claimed in claim 1, wherein the component a) comprises one or more sulfonamides.

13. A process as claimed in claim 12, wherein the coolant composition comprises from 0.5 to 10% by weight of component a).

14. A process as claimed in claim 12, wherein the coolant composition comprises from 1 to 10% by weight of component a).

15. A process as claimed in claim 12, wherein the one or more sulfonamides is/are aliphatic.

* * * * *